US012039227B2

United States Patent
Krishnan et al.

(10) Patent No.: US 12,039,227 B2
(45) Date of Patent: Jul. 16, 2024

(54) AUTOMATED ASSISTANT SUGGESTIONS FOR THIRD-PARTY VEHICLE COMPUTING DEVICES WITH RESTRICTED ARCHITECTURE

(71) Applicant: Google LLC, Mountain View, CA (US)

(72) Inventors: Vinod Krishnan, Santa Clara, CA (US); Vikram Aggarwal, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 73 days.

(21) Appl. No.: 17/306,443

(22) Filed: May 3, 2021

(65) Prior Publication Data
US 2021/0255828 A1 Aug. 19, 2021

Related U.S. Application Data

(63) Continuation of application No. 16/613,668, filed as application No. PCT/US2019/031498 on May 9, 2019, now Pat. No. 10,996,925.

(51) Int. Cl.
G06F 3/16 (2006.01)
G06F 3/0481 (2022.01)

(52) U.S. Cl.
CPC ............ G06F 3/167 (2013.01); G06F 3/0481 (2013.01)

(58) Field of Classification Search
CPC .................. G06F 3/167; G06F 3/0481
See application file for complete search history.

(56) References Cited

U.S. PATENT DOCUMENTS 9,501,583 B2 11/2016 Nordstrom
9,798,799 B2 10/2017 Wolverton et al.
(Continued)

FOREIGN PATENT DOCUMENTS

JP 2014521141 8/2014
KR 20180006966 1/2018
(Continued)

OTHER PUBLICATIONS

European Patent Office; Communication pursuant to Article 94(3) EPC; 10 pages; dated Jul. 9, 2021.
(Continued)

Primary Examiner — William L Bashore
Assistant Examiner — Gregory A Distefano
(74) Attorney, Agent, or Firm — Gray Ice Higdon

(57) ABSTRACT

Implementations set forth herein relate an automated assistant that provides suggestion elements at an OEM application and/or third-party application that is accessible via an OEM vehicle computing device, which employs restrictions on communications between local applications. The automated assistant can render suggestions via OEM vehicle applications and/or third-party applications, and initialize actions for performance via the OEM vehicle applications and/or the third-party applications—despite the limitations. The suggestions can be rendered at a graphical user interface of a vehicle, and include content that, when spoken by a user, causes the automated assistant to initialize such actions. Actions that are suggested by the automated assistant can be performed by third-party applications that are different from a third-party application that is rendering the suggestion. In this way, a common automated assistant can be indiscriminately available via various vehicle computing devices, despite differences in restrictions of communications between vehicle applications.

20 Claims, 9 Drawing Sheets

(56) References Cited

U.S. PATENT DOCUMENTS

| | | | |
|---|---|---|---|
| 10,198,877 B1 | 2/2019 | Maltsev et al. | |
| 10,996,925 B2 | 5/2021 | Krishnan et al. | |
| 2008/0046515 A1* | 2/2008 | Lingafelt | H04L 12/1822 709/204 |
| 2008/0082257 A1* | 4/2008 | Lee | G01C 21/3697 701/465 |
| 2010/0151827 A1* | 6/2010 | Goyal | H04M 3/42382 455/412.1 |
| 2014/0108307 A1 | 4/2014 | Raghunathan et al. | |
| 2014/0136187 A1 | 5/2014 | Wolverton et al. | |
| 2014/0309806 A1* | 10/2014 | Ricci | H04W 48/04 701/1 |
| 2015/0312409 A1* | 10/2015 | Czarnecki | H04L 51/00 455/414.1 |
| 2016/0150020 A1 | 5/2016 | Farmer et al. | |
| 2016/0308798 A1* | 10/2016 | Magistrado | G06F 3/04842 |
| 2016/0350304 A1 | 12/2016 | Aggarwal et al. | |
| 2017/0329790 A1* | 11/2017 | Johns | G06F 3/0482 |
| 2017/0352082 A1 | 12/2017 | Aziz | |
| 2018/0088795 A1* | 3/2018 | van Os | H04W 4/02 |
| 2018/0109412 A1* | 4/2018 | Xuan | H04L 41/22 |
| 2018/0309706 A1* | 10/2018 | Kim | G10L 15/1815 |
| 2019/0066674 A1* | 2/2019 | Jaygarl | G10L 15/22 |
| 2019/0124019 A1* | 4/2019 | Leon | H04L 51/02 |

FOREIGN PATENT DOCUMENTS

| | | |
|---|---|---|
| KR | 20180133525 | 12/2018 |
| KR | 20180134994 | 12/2018 |
| WO | 2020226650 | 11/2020 |

OTHER PUBLICATIONS

Japanese Patent Office; Notice of Reasons for Rejection issued in app. No. 2021-543211, 9 pages, dated Jun. 20, 2022.

Australian Government; Examination Report No. 1 issued in Application No. 2019444479, 3 pages, dated Apr. 29, 2022.

European Patent Office; International Search Report and Written Opinion of Ser. No. PCT/US2019/031498; 17 pages; dated Jan. 2, 2020.

European Patent Office; Summons to Attend Oral Proceedings Pursuant to Rule 115(1) EPC issued for Application No. 19725590. 4, 13 pages, dated Jan. 19, 2023.

Japanese Patent Office; Decision of Rejection issued for Application No. 2021-543211, 6 pages, dated Feb. 20, 2023.

Australian Government; Examination Report No. 3 issued for Application No. 2019444479, 3 pages, dated Feb. 22, 2023.

Australian Government; Examination Report No. 2 issued in Application No. 2019444479, 3 pages, dated Nov. 15, 2022.

European Patent Office; Minutes issued in Application No. 19725590. 4; 10 pages; dated Jun. 5, 2023.

European Patent Office; Provision of the minutes in accordance with Rule 124(4) EPC issued in Application No. 19725590.4; 7 pages; dated Jun. 22, 2023.

European Patent Office; Decision to refuse a European Patent application issued in Application No. 19725590.4; 25 pages; dated Jun. 26, 2023.

Australian Government: Examination Report issued for Application No. 2023202550, 3 pages, dated Dec. 18, 2023.

Korean Intellectual Property Office; Notice of Office Action issued in Application No. 1020217036951; 24 pages; dated Aug. 29, 2023.

Australian Government: Notice of Acceptance issued for Application No. 2023202550, 3 pages, dated May 17, 2024.

* cited by examiner

AUTOMATED ASSISTANT SUGGESTIONS FOR THIRD-PARTY VEHICLE COMPUTING DEVICES WITH RESTRICTED ARCHITECTURE

BACKGROUND

Computing devices and their respective applications typically provide robust functionality to assist a user with various tasks. A provider of a particular application or device may not expect the user to employ all functionality during an initial use, but rather learn the functions of the application or device over time. When a particular device provides access to an automated assistant, the automated assistant can act to familiarize the user with various functions using suggestions, which direct the user to control one or more actions of the particular device and/or application. However, in some instances, such as at a vehicle computing device or other OEM computing device, the automated assistant may be accessible through the vehicle computing device but limited in the types of data that can be gathered from operations of the vehicle computing device. As a result, any suggestions made by the automated assistant may not be suitably tailored to functions of the vehicle computing device and/or other applications that may enable more effective and/or efficient use of the vehicle and/or vehicle computing device.

Furthermore, such limitations can prevent the user from learning about safety functions of the vehicle computing device sooner. In other words, because the vehicle computing device can provide a plethora of safety features that a user could not reasonably be expected to instantly acknowledge, any delays in learning about such features could limit the safety and/or utility of the vehicle. Additionally, because a user may spend much of their time controlling the vehicle in order to navigate rather than learning features, the user would not be reaping the benefits, such as reducing power consumption and increasing efficiency. This can be especially apparent when the vehicle computing device is not exclusively proactive about suggesting functionality to the user—as such benefits are often realized when users outsource various tasks to a computing device.

SUMMARY

Implementations set forth herein relate to a hierarchy of vehicle applications provided at a vehicle computing device that also includes an automated assistant, which can render suggestions via the vehicle applications and initialize actions via the vehicle applications. The vehicle applications can be loaded onto a vehicle computing device of a vehicle, and can provide a variety of functionality related to navigation, communication, media, and/or any other type of services capable of being provided by a computing device. The vehicle computing device can operate according to an operating system that is loaded onto the vehicle computing device and includes one or more original equipment manufacturer (OEM) applications. The OEM applications can be provided by an entity or source that also provides the vehicle. Furthermore, the vehicle computing device can also include one or more vehicle applications provided by a third-party source (i.e. third party applications rather than native vehicle applications), as well as an automated assistant that is provided by a separate source from the third-party source. Communications between the automated assistant and the other applications can be restricted to communications which occur via the vehicle computing device, which can improve reliability of the vehicle systems. The automated assistant can be remote from the vehicle computing device. One or more actions suggested by the automated assistant may be performed by the local vehicle applications (whether native OEM applications or third-party applications), which can improve reliability of vehicle performance, particularly in situations where it is desirable that a vehicle retains full control of its systems, such as in an autonomous vehicle environment. One or more actions may be performed by the remote automated assistant, which can protect user data and information associated with the automated assistant (assistant data), and thus improve user privacy and data security, by preventing the local vehicle applications from having access to the user data.

In some implementations, while the user is riding in the vehicle, an OEM vehicle application and/or the automated assistant can render a graphical user interface that includes a variety of different content that is based on data from one or more other vehicle applications. For example, the graphical user interface can include a first area for rendering navigation related content, a second area for rendering communication related content, and/or a third area for rendering automated assistant content. In order for a user to learn various functions of the vehicle computing device and/or the vehicle applications, the automated assistant can provide and/or cause suggestions to be rendered at each area of the graphical user interface. As a result, despite an automated assistant being accessible via a variety of different vehicles, by using data from one or more other vehicle applications provided at the vehicle computing device the automated assistant will nonetheless be able to provide suggestions for users, regardless of the vehicle in which the automated assistant is operating.

In some implementations, when the graphical user interface is displaying at least the first area and the second area, the OEM vehicle application can generate data characterizing what is provided at the user interface, and provide this generated data to the automated assistant. The data can characterize or, as used herein, indicate some or all of the content provided at the graphical user interface, in order to provide a context with which the automated assistant can generate suggestions. For example, when the first area is displaying navigation directions to a destination, and the second area is displaying a notification regarding an incoming phone call, the OEM vehicle application can generate data characterizing (or indicating) the status of the incoming phone call and the status of the navigation to the destination. In some implementations, the automated assistant can use the data to generate one or more suggestions or actions to be performed by the automated assistant, and/or any other application that is accessible via the vehicle computing device.

For example, the automated assistant can provide a suggestion element at the graphical user interface for invoking a messaging application to provide an estimated a-time of arrival to a person who is the source of the incoming call. The automated assistant can cause the suggestion element to be provided at the second area of the graphical user interface because the suggestion is related to communications. The suggestion element can include natural language content characterizing (or indicating) any action the assistant can take such as, "Send Megan my estimated time of arrival." The natural language content can be text provided at the suggestion element, can be an example utterance for invoking the automated assistant to perform an action associated with the suggestion element, and/or can otherwise characterize a spoken utterance for invoking the automated assistant. For example, in order to invoke the automated assistant to cause a message to be sent, the user can tap the display panel at a location in which the suggestion element is being rendered, and/or provide a spoken input that includes at least a portion of the spoken utterance rendered at the graphical user interface (e.g., "Assistant, send a message to Megan indicating my ETA."). In another example, the spoken input can have the same meaning or intent as the natural language content of the suggestion element.

In some implementations, the OEM vehicle application can provide the automated assistant with various data over time, at least in response to changes in content being rendered at the display panel of the vehicle computing device. As subsequent data is received by the automated assistant from the OEM vehicle application, the automated assistant can generate further suggestions, and/or rank suggestions according to a variety of different properties. In some instances, a suggestion element provided by the automated assistant can be ranked according to a strength of correlation between assistant data and vehicle application data provided by the OEM vehicle application. For example, vehicle application data characterizing a destination displayed at the display panel can have a stronger correlation to assistant data that also identifies the destination, and this "stronger" correlation can be relative to when the vehicle application data does not identify the destination that is also identified by the assistant data.

A set of suggestion elements can be generated for each area of the graphical user interface that is associated with a particular type of application and/or activity. For each set of suggestion elements, a rank can be assigned for each suggestion element of the set of suggestion elements. In this way, when a suggestion element is to be rendered at a particular area of the graphical user interface, a suggestion element that is selected to be rendered can be a highest ranking suggestion element from the set of suggestion elements corresponding to the particular area. In some implementations, a ranking for a particular suggestion element can be based on content of the entire graphical user interface, previous interactions between the user and the automated assistant, third-party application data that is available to the automated assistant with permission from the user, vehicle data characterizing one or more operations of the vehicle, and/or any other information from which a ranking for a suggestion can be based.

In some implementations, the automated assistant can provide suggestions for third-party vehicle applications to render, and these suggestions can be generated based on information from the OEM vehicle application. For example, multiple different third-party applications can be accessible via the vehicle computing device, and can communicate with the OEM vehicle application in order to send and/or receive data. In some implementations, the OEM vehicle application can limit communications between other applications on the vehicle computing device. Therefore, the third-party application may not be able to communicate with the automated assistant locally, but rather communicate and exclusively via vehicle computing device—rather, the automated assistant can thus be aware of operations being performed by the third-party application using data that is provided by the OEM vehicle application instead of through direct communication with the third-party application.

For example, when the third-party application is rendering content at the display panel of the vehicle computing device, the OEM vehicle application can generate data that characterizes the content, and provide the data to the automated assistant. Alternatively, or additionally, the third-party application can communicate with a remote computing device, such as a server, in order to provide data to the automated assistant (e.g., using an automated assistant application programming interface (API)). Suggestion data can then be generated via the automated assistant, and then shared with the OEM vehicle application and/or a remote device associated with the third-party application. One or more suggestion elements can then be presented at the graphical user interface of the third-party application based on the suggestion data. In this way, despite the OEM vehicle application limiting communications between local applications to communications which occur exclusively via the vehicle computing device, the automated assistant can nonetheless provide suggestions to the user for various actions that the user may not be aware of, at least with respect to the vehicle computing device and/or the vehicle.

In some implementations, the automated assistant can bypass providing suggestions related to actions that have recently been performed at the direction of the user via a third-party application and/or the OEM vehicle application. For example, when a third-party application corresponds to a vehicle maintenance application, and the vehicle maintenance application provides a notification indicating that a part of the vehicle needs attention, the automated assistant can be informed of this notification via the OEM vehicle application. For instance, when the vehicle maintenance application indicates that the vehicle needs gas and/or charge, the vehicle maintenance application can provide notifications about nearby places to refuel the vehicle. The OEM vehicle application can generate data based on the notifications and/or content being rendered at the graphical user interface of the third-party application, and provide the generated data to the automated assistant. The automated assistant can use the data to generate suggestions, which can be ranked and/or filtered according to what has already been presented to the user.

For example, when a generated suggestion corresponds to a nearby place to refuel the vehicle, the generated suggestion can be ranked (i.e., prioritized) lower than a separate suggestion that does not correspond to the nearby place to refuel the vehicle. As a result, other suggestions regarding, for example, spoken utterances for obtaining other information about the vehicle (e.g., "Assistant, what is my highway miles per gallon?"), can be prioritized higher than suggestions related to nearby places to refuel. Alternatively, or additionally, other suggestions can be generated based on a comparison between the data that is based on the content from the third-party application, and assistant data, where assistant data is data that is associated with interactions between the user and the automated assistant. For example, the assistant data can comprise content of previous interactions between the user and the automated assistant, contact information or calendar information linked to, or associated with, an account of the user and interacted with by the user through the automated assistant, and/or the assistant data can comprise time and/or location information associated with a time and/or location of user interaction with the automated assistant. In one example, the data from the OEM vehicle application can be compared to the assistant data to determine that the notification from the third-party application is associated with an operating feature of the vehicle. Based on this determination, the automated assistant can determine when the user has previously participated in a dialogue session with the automated assistant regarding operating features of the vehicle.

For instance, the user may have queried the automated assistant to find out what the appropriate tire pressure is for their vehicle. Therefore, in response to receiving the data from the OEM vehicle application, the automated assistant can generate a suggestion characterizing a spoken utterance such as, "Assistant, what is the tire pressure of my vehicle?" Suggestion data corresponding to this suggestion can be transmitted from the automated assistant to the OEM vehicle application and/or third-party application, and the third-party application can then present the suggestion at the graphical user interface with the content characterizing the fuel status of the vehicle. In this way, while the user is being notified about refueling their vehicle, the user can learn to conduct similar dialogue sessions to check on other matters related to the vehicle, in order that such matters can be addressed sooner, thereby promoting a healthy routine of vehicle maintenance.

Other implementations may include a computer program or non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
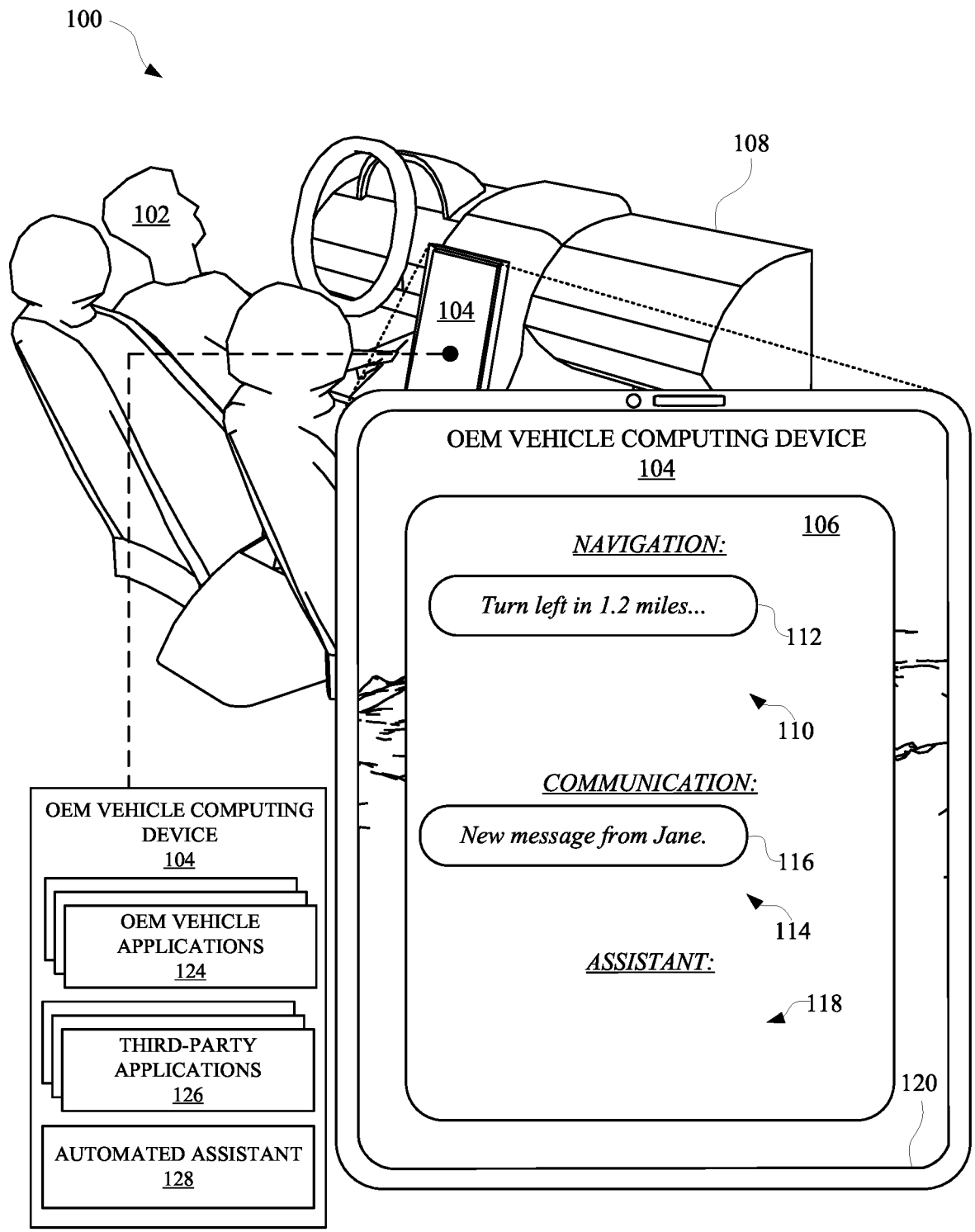
FIG. 1A, FIG. 1B, and FIG. 1C illustrate views of a vehicle that includes an OEM vehicle computing device that provides access to an automated assistant.
Figure 1B:
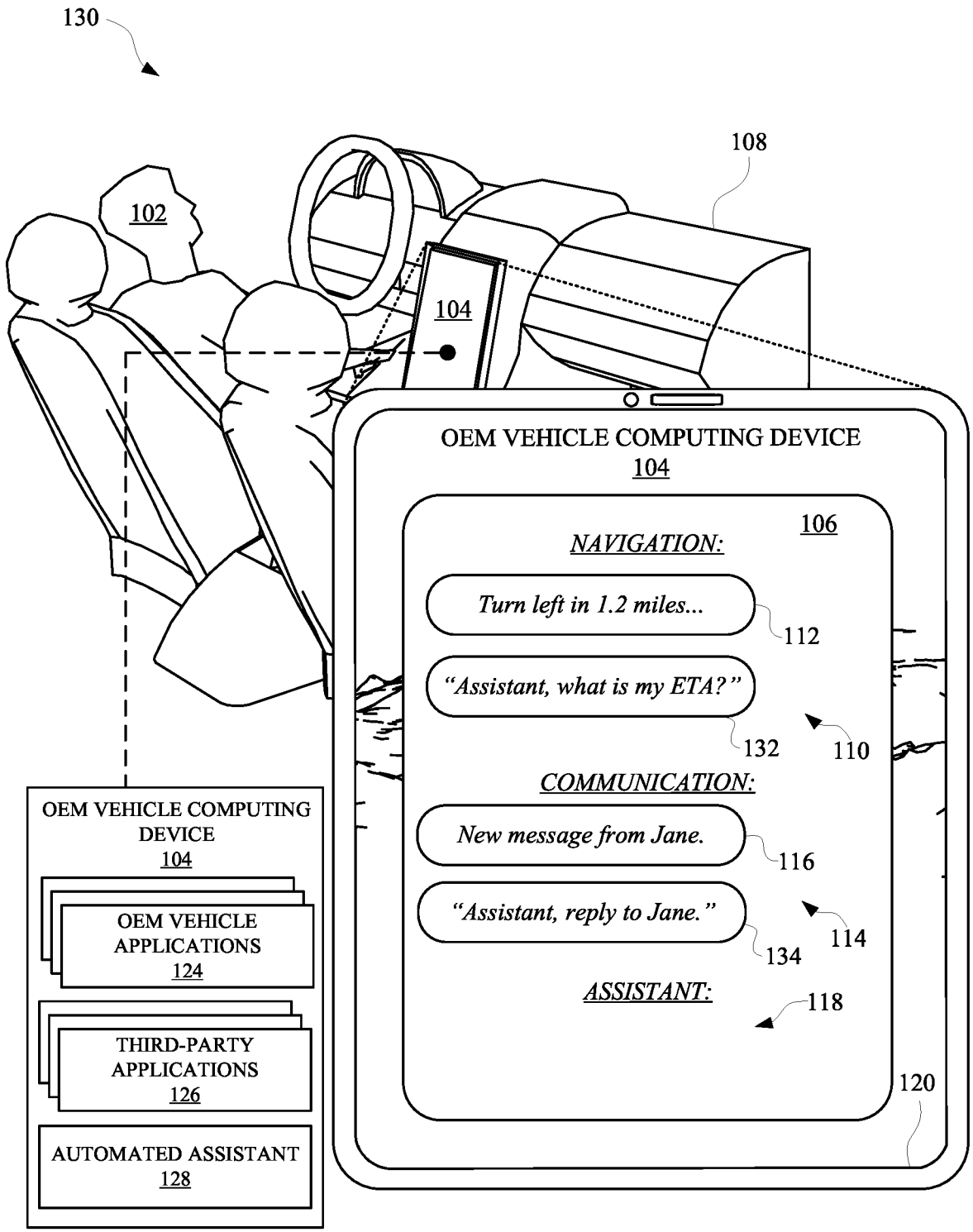
Figure 1C:
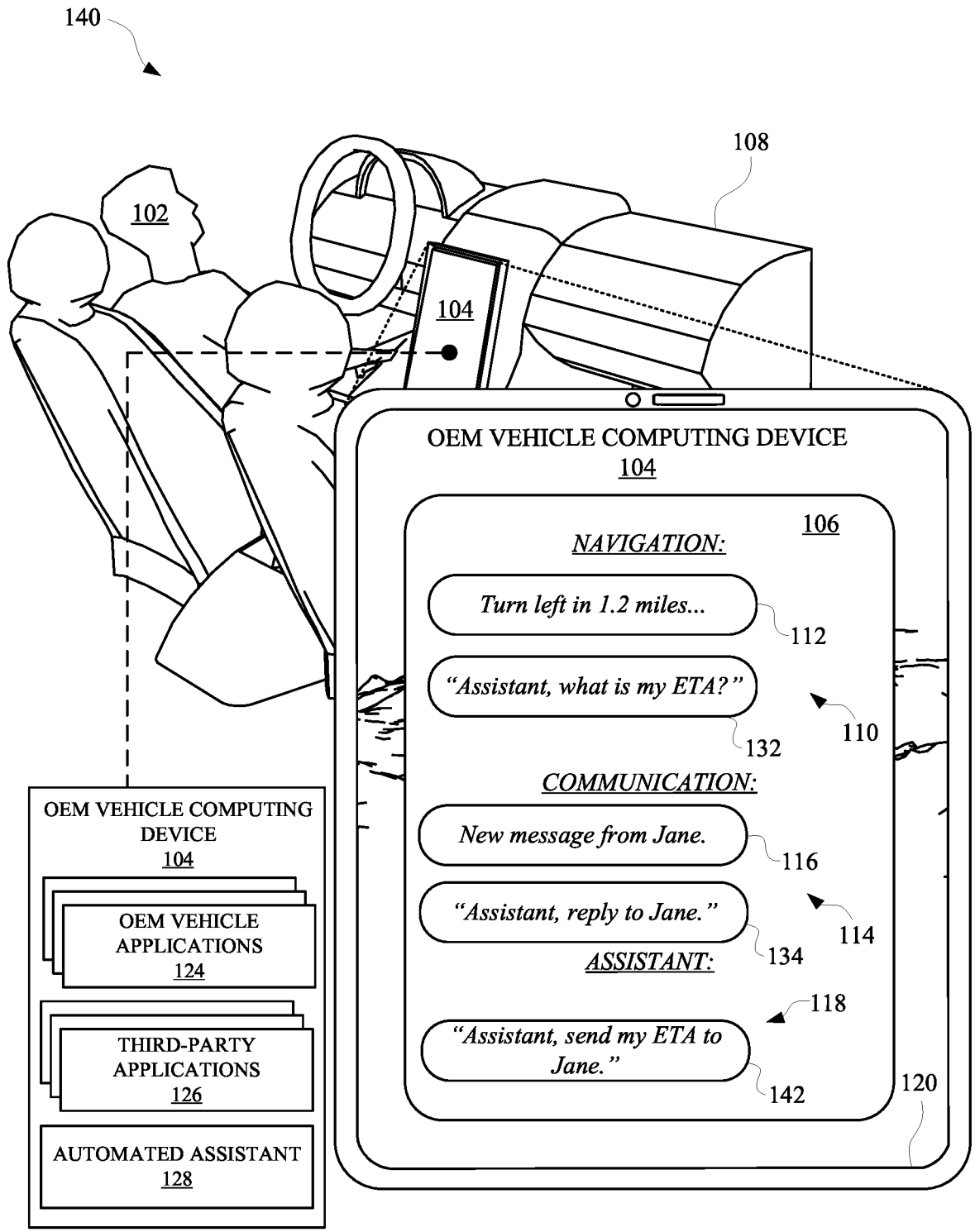

FIG. 1A, FIG. 1B, and FIG. 1C illustrate view 100, view 130, and view 140 of a vehicle 108 that includes an OEM vehicle computing device 104 that provides access to an automated assistant 128, which can cause suggestions to be rendered at a graphical user interface 106 of an OEM vehicle application 124 and/or a third-party application 126. Specifically FIG. 1A illustrates a view 100 of the OEM vehicle computing device 104 providing the graphical user interface 106 with one or more at different areas corresponding to different applications and/or content that can be presented at the graphical user interface 106. The OEM vehicle computing device 104 can include one or more OEM vehicle applications 124, one or more third-party applications 126, and/or an automated assistant 128. While the user 102 is riding in the vehicle 108, one or more applications accessible via the OEM vehicle computing device 104 can communicate with a particular OEM vehicle application 124 in order to cause certain content to be rendered at the graphical user interface 106.

For example, the OEM vehicle computing device 104 can include an OEM vehicle application 124 such as a navigation application, which can cause content to be rendered at a first area 110 of the graphical user interface 106. Alternatively, or additionally, the OEM vehicle computing device 104 can include a third-party application 126 such as a messaging application, which can cause other content to be rendered at a second area 114 of the graphical user interface 106. Each application that provides data for rendering content at the graphical user interface 106 can communicate with a particular OEM vehicle application 124. This particular OEM vehicle application can communicate with other OEM vehicle applications 124, third-party applications 126, and the automated assistant 128. For example, the navigation application can provide data characterizing upcoming navigation instructions, which can be rendered as a first graphical element 112 in the first area 110 of the graphical user interface 106. Furthermore, the messaging application can provide other data characterizing (or indicating content of) an incoming message, and the other day that can be rendered as a second graphical element 116 by the particular OEM vehicle application 124 at the graphical user interface 106.

In some implementations, the particular OEM vehicle application 124 can mediate communications between applications by generating data that characterizes content provided by one or more applications of the OEM vehicle computing device 104, and providing the generated data to the automated assistant 128. For example, the generated data can characterize natural language content provided in the first graphical element 112 and other natural language content provided in the second graphical element 116. The particular OEM vehicle application 124 can provide this generated data to the automated assistant 128 oh, and the automated assistant 128 can use the generated data to provide additional suggestions for each respective area of the graphical user interface 106.

FIG. 1B illustrates a view 130 of the graphical user interface 106 providing make space for a suggestion element for each area of the graphical user interface 106 based on data provided by the automated assistant 128, and which suggestion element was generated based on data from a particular OEM vehicle application 124 and based on the data from the OEM vehicle application 124 being associated with assistant data. The vehicle application data and the assistant data can be associated, or correlated, if the vehicle application data corresponds at least in part to data which is associated with interactions between the user and the automated assistant. For example, the vehicle application data may correspond to content of a previous interaction or dialog session between the user and the automated assistant, relate to a previous action performed by the automated assistant, indicate an action associated with a location or contact linked to the user, or otherwise correspond to the assistant data. Specifically, a particular OEM vehicle application 124 can provide the automated assistant 128 with data characterizing content of the first graphical element 112. The automated assistant 128 can receive the data from the OEM vehicle application 124 and generate a suggestion data based on the received data. In some implementations, the received data can be compared to one or more actions capable of being performed by the automated assistant 128, and based on the comparison, suggestion data can be generated. Additionally, or alternatively, the OEM vehicle application 124 can provide the automated assistant 128 with other data characterizing content of the second graphical element 116. The automated assistant 128 can other received the data to be processed for determining a correlation between the other received data and one or more actions capable of being performed by the automated assistant 128. Based on the comparison, other suggestion data can be generated and provided to the OEM vehicle application 124.

In response to the OEM vehicle application 124 receiving suggestion data from the automated assistant 128, the OEM vehicle application 124 can cause suggestion elements to be rendered at the graphical user interface 106. For example, the OEM vehicle applications 124 can include a launcher application that renders contact characterizing operational status of one or more applications, and also initialize one or more actions of one or more applications according to data received from the automated assistant 128. For example, the automated assistant 128 can provide suggestion data characterizing a first suggestion element 132, which can characterize a spoken utterance that, when spoken by the user and/or another user, causes the automated assistant to initialize or perform a particular action. For example, the vehicle application can provide an indication of the selection to the automated assistant, and the automated assistant can cause another application of the vehicle computing device to perform the action. The other application can be a third-party application (i.e. from a different source than the automated assistant and the vehicle OEM applications) or one of the OEM vehicle applications. Furthermore, the automated assistant 128 can provide other suggestion data characterizing a second suggestion element 134, which can characterize a different spoken utterance that, when is spoken by the user and/or another user, causes the automated assistant 128 to initialize or perform a different particular action. For instance, the first suggestion element 132 can characterize a spoken utterance such as, "Assistant, what is my ETA?"

In response to the user tapping on the suggestion element at a display panel 120, or providing a spoken input that includes at least some amount of content of the suggestion element 132, the automated assistant can communicate an estimated time of arrival at the destination to the user. Furthermore, the second suggestion element 134 can characterize a spoken utterance such as, "Assistant, reply to Jane." In response to the user tapping the second suggestion element 134 at the display panel 120, and/or providing a spoken input that includes at least some of the content of the second suggestion element 134, the automated assistant 128 can prompt the user to provide additional content for a message to be transmitted to a contact named Jane. In this way, the user can be put on notice that they can employ the automated assistant to initialize actions of the OEM vehicle applications 124 and/or the third-party applications 126, and/or otherwise perform actions based on information provided by the vehicle application 124 and/or the third-party applications 126.

FIG. 1C illustrates a view 140 of the automated assistant 128 causing a launcher OEM vehicle application 124 to provide a suggestion element that is based on content presented at the graphical user interface 106 for multiple different applications. Specifically, a third suggestion element 142 can be generated by the automated assistant 128 using vehicle application data provided by the launcher OEM vehicle application 124. The launcher OEM vehicle application 124 can receive data from multiple different third-party applications and/or other OEM vehicle applications 124 for rendering at the graphical user interface 106. The launcher OEM vehicle application 124 can generate data characterizing content being presented at the graphical user interface 106, and provide the generated data to the automated assistant 128. The automated assistant 128 can use received data from the launcher OEM vehicle application 124 to generate suggestion data, which can be rendered in a third area 118 of the graphical user interface 106.

The suggestion data can be generated via the automated assistant 128 in order to provide a suggestion to the user that relates to multiple different sources of content being presented at the graphical user interface 106. In some implementations, the generated data from the launcher OEM vehicle application 124 can characterize an ongoing action being performed by a separate OEM vehicle application, as well as a recently performed action or recently presented notification provided by a separate third-party application 126. In order to generate a suitable suggestion for the user 102, the automated assistant 128 can determine whether any of the generated data (which characterizes or indicates the content being presented at the graphical user interface 106) carries any relationship to assistant data that is accessible to the automated assistant 128. For example, because of the automated assistant 128 can be linked to an account of the user 102, the automated assistant 128 can be notified of the incoming message to be third-party application from a contact of the user called "Jane." Based on this association or relationship between the content of the second graphical element 116 and the assistant data that also indicates the incoming message, the automated assistant 128 can generate a blank message for replying to Jane. Furthermore, the automated assistant 128 can also determine a relationship between content of the first graphical element 112 and the assistant data. For example, the assistant data can characterize one or more actions capable of being performed or initialized by the automated assistant 128.

The suggestion data can be generated via the automated assistant 128 in order to provide a suggestion to the user that relates to multiple different sources of content being presented at the graphical user interface 106. In some implementations, the generated data from the launcher OEM vehicle application 124 can characterize an ongoing action being performed by a separate OEM vehicle application, as well as a recently performed action or recently presented notification provided by a separate third-party application 126. In order to generate a suitable suggestion for the user 102, the automated assistant 128 can determine whether any of the generated data carries any relationship to assistant data that is accessible to the automated assistant 128. For example, because of the automated assistant 128 can be linked to an account of the user 102, the automated assistant 128 can be notified of the incoming message to be third-party application from the user's known contact "Jane." Based on this relationship between the content of the second graphical element 116 and the assistant data that also indicates the incoming message, the automated assistant 128 can generate a blank message for replying to Jane. Furthermore, the automated assistant 128 can also determine a relationship between content of the first graphical element 112 and the assistant data. For example, the assistant data can characterize one or more actions capable of being performed or initialized by the automated assistant 128.

Figure 2A:
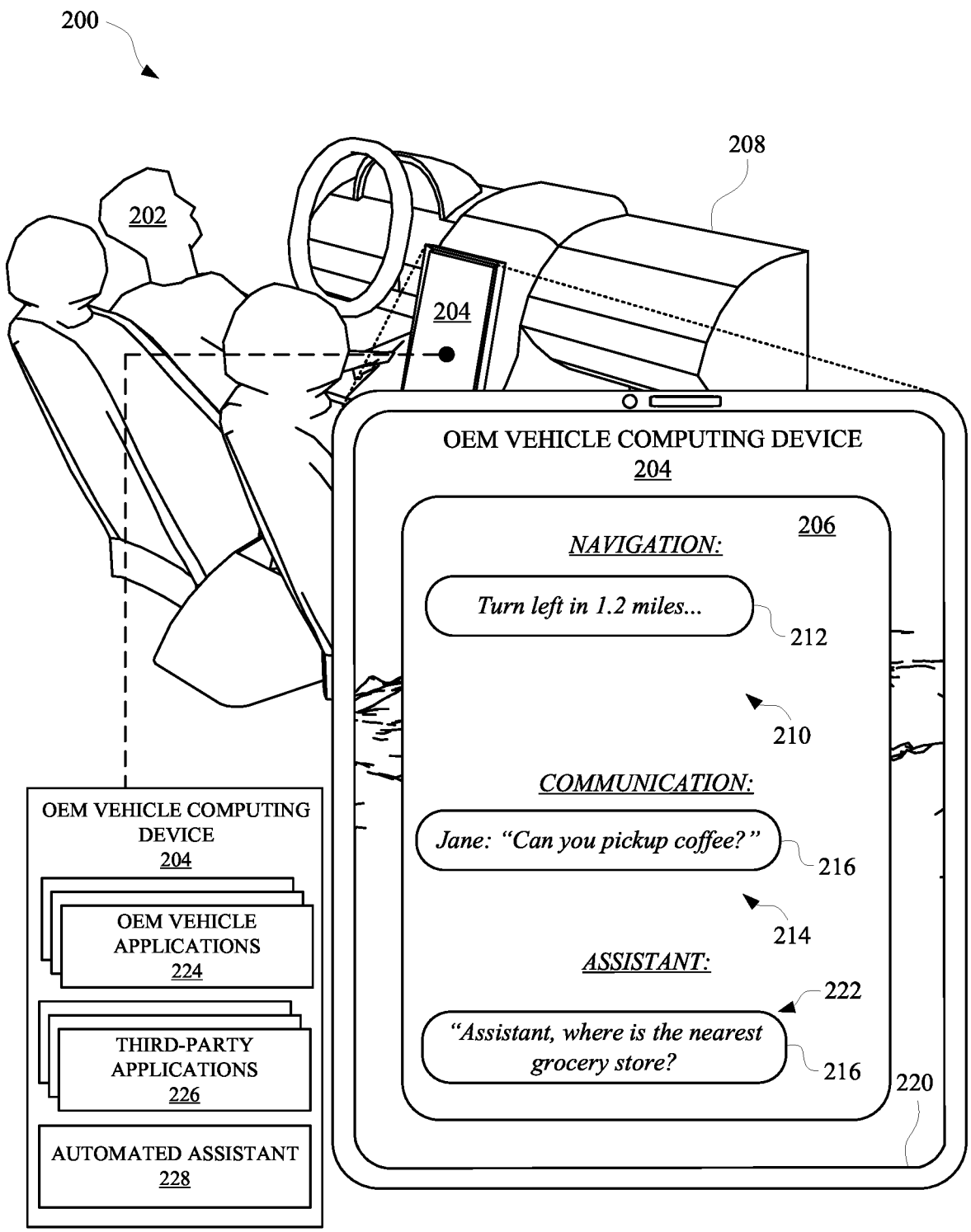
FIG. 2A, FIG. 2B, and FIG. 2C illustrate one or more implementations of an automated assistant that provides suggestion elements at an OEM application and/or third-party application that is accessible via an OEM vehicle computing device, which employs restrictions on communications between local applications.
Figure 2B:
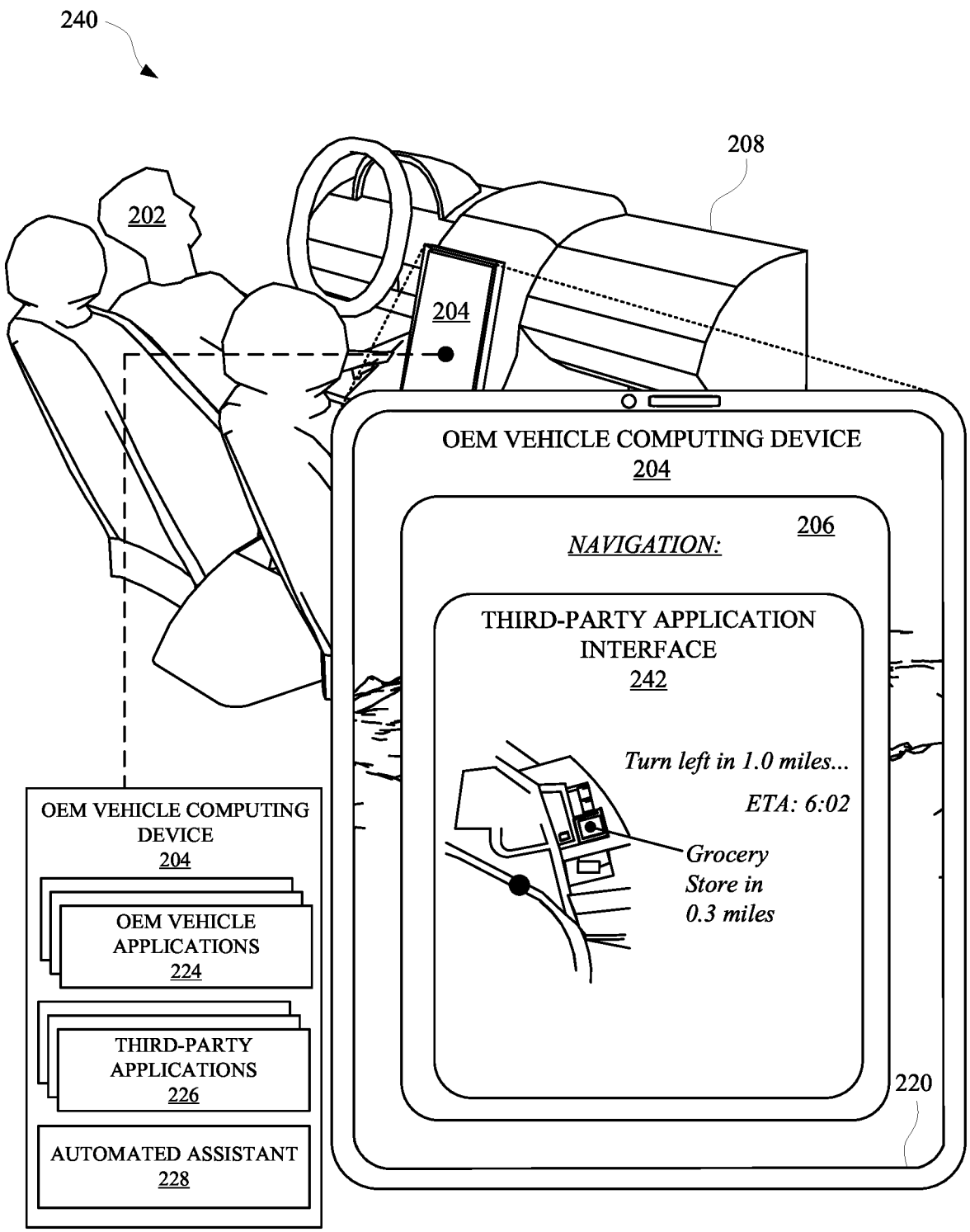
Figure 2C:
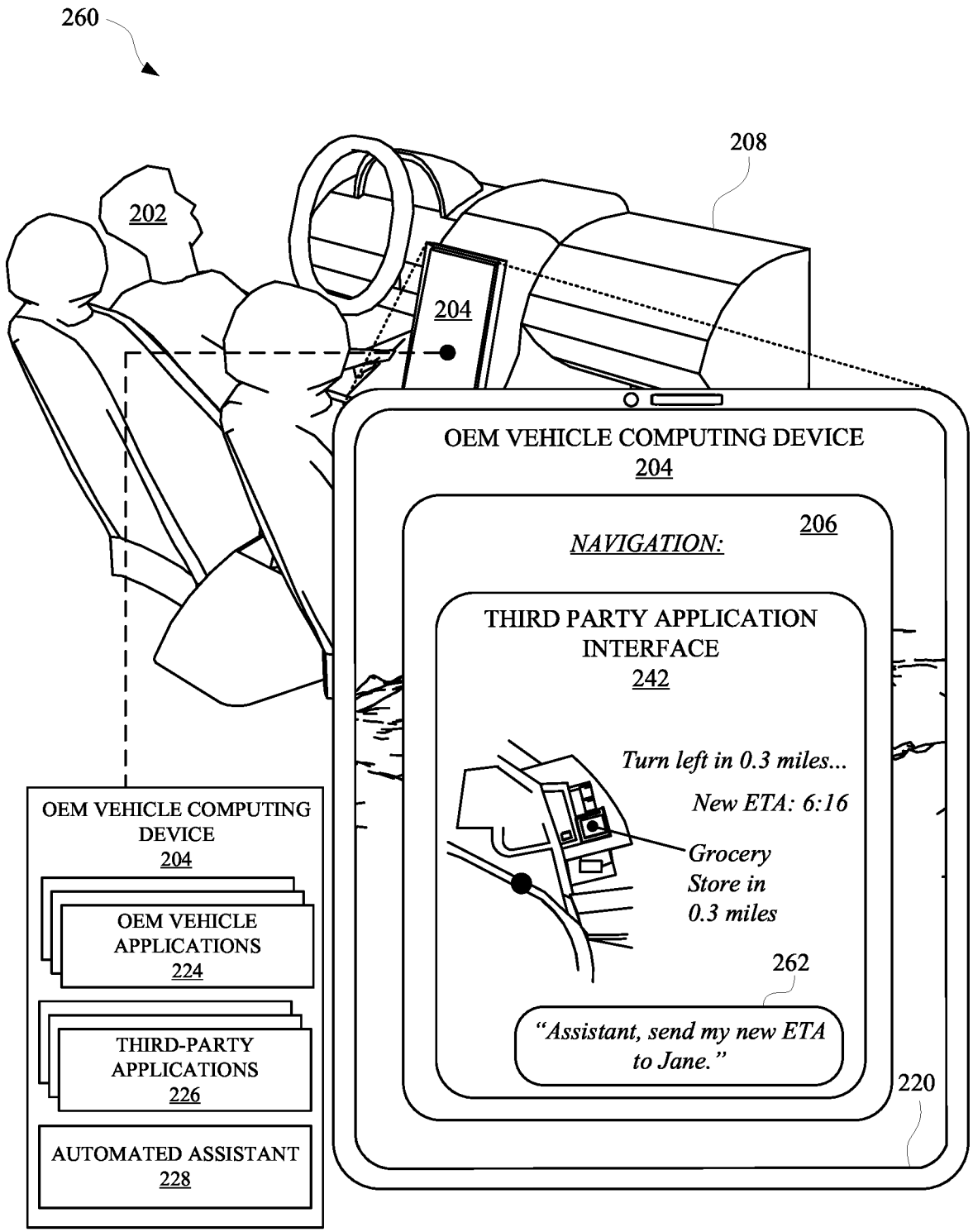

FIG. 2A, FIG. 2B, and FIG. 2C illustrate one or more implementations of an automated assistant 228 that provides suggestion elements at an OEM application and/or third-party application that is accessible via an OEM vehicle computing device 204, which employs restrictions on communications between local applications. For instance, as provided in view 200 of FIG. 2A, the OEM vehicle computing device 204 can include OEM vehicle applications 224, third-party applications 226, and/or an automated assistant 228. The OEM vehicle computing device 204 can enforce access restrictions on the automated assistant 228, thereby limiting access to locally stored data of the OEM vehicle applications 224 and locally stored data of the third-party applications 226 to the automated assistant 228. However, one or more of the OEM vehicle application 224 can provide some amount of data to the automated assistant 228 regarding operations of a vehicle 208, the OEM vehicle computing device 204, the OEM vehicle applications 224, the third-party applications 226, and/or any other information that can be associated with the vehicle 208.

For example, a launcher OEM vehicle application can generate content data characterizing content of a graphical user interface 206 being rendered at a display panel 220 of the OEM vehicle computing device 204. The content data can characterize natural language content presented in a first area 210 of the graphical user interface 206. The first area 210 can include a first graphical element 212 associated with a third-party application, such as a navigation application. The content data can also characterize natural language content presented in a second area 214 of the graphical user interface 206. The second area 214 can include a second a graphical element 216 associated with a third-party application, such as a messaging application.

In order to familiarize a user 202 with functionality that allows the automated assistant at 228 to initialize OEM vehicle applications 224 and/or third-party applications 226, the automated assistant 228 can provide suggestion elements related to such functionality. In other words, the automated assistant 228 can use the content data from the OEM vehicle application 224 to generate suggestions for spoken utterances that can be provided by the user 202 for invoking the automated assistant 228 to initialize performance of an action by another OEM vehicle application 224 and/or a third-party application 226.

For example, the automated assistant 228 can use the content data to generate suggestion data corresponding to a suggestion for the user to provide a command that relates to both the content of the first graphical element 212 and content of the second graphical element 216. In this way, the automated assistant 228 is acting within the bounds of the restrictions enforced by the OEM vehicle computing device 204 while still providing useful suggestions to promote usage of all functionality of the OEM vehicle computing device 204. For instance, the suggestion data can characterize a spoken utterance such as, "Assistant, where is the nearest grocery store?" This is spoken utterance can be suggested based on the navigation application conducting an ongoing action of directing the user to a particular destination, and the user 202 receiving a message regarding picking up coffee during their drive in the vehicle 208. The suggestion data can be provided to the launcher OEM vehicle application, which can process the suggestion data and cause a third graphical element 214 to be presented within a third area 222 of the graphical user interface 206. As a result, a suggestion is presented to the user 202 without the automated assistant 228 violating any access restrictions set forth by the OEM vehicle computing device 204, thereby allowing other instances of the automated assistant to operate on other vehicles with similar restrictions. Additionally or alternatively, the automated assistant 228 can use the content data to generate suggestion data corresponding to a suggestion for the user to provide a command that relates to only one of the content of the first graphical element 212 or the content of the second graphical element 216.

In some implementations, in response to the user tapping the third graphical element 216 and/or providing the identified spoken utterance to the OEM vehicle computing device 204, the automated assistant 228 can be invoked. Furthermore, in response to the spoken utterance, the automated assistant at 228 can initialize performance of one or more corresponding actions by the navigation application. For instance, in response to the automated assistant 228 receiving the spoken utterance, "Assistant where is the nearest grocery store?" The automated assistant 228 can generate command data to be provided to the launcher OEM vehicle application and/or a server device that is associated with the navigation application. The command data can characterize one or more commands that have been generated according to an API corresponding to the navigation application. When the launcher OEM application and/or the server device receives the command data, the launcher OEM application and/or the server device can initialize execution of the one or more commands via the navigation application, and/or any other third-party application 226.

In response to execution of one or more are the commands being initialized, the navigation application can cause a third-party application interface 242 to be provided at the graphical user interface 206, as illustrated in view 240 of FIG. 2B. Therefore, despite the limitations set forth by the launcher OEM vehicle application, the user can provide spoken utterances to the automated assistant 228 in order to invoke a third-party application to perform one or more actions at the OEM vehicle computing device 204. In furtherance of the aforementioned example, the third-party application 226 can provide content to the launcher OEM vehicle application for providing the third-party application interface 242. Furthermore, the content can characterize a location of a nearby grocery store, details regarding the route through which the user is currently taking, and details about when the user 202 will arrive at the destination.

In some implementations, the launcher OEM vehicle application can generate data characterizing the content provided at the graphical user interface 206. This generated data can be provided to the automated assistant 228, which can generate further suggestions based on recent changes to the graphical user interface 206. Specifically, the generated data can characterize content provided at the third-party application interface 242, and the automated assistant 228 can use the generated data in order to generate other suggestion data for causing the automated assistant 228 to initialize performance of one or more actions by an OEM vehicle application 224 and/or a third-party application 226. Furthermore, the suggestion data can characterize one or more actions that are relevant to the content provided at the graphical user interface 206, despite the one or more actions being performed by an application that is different from the navigation application, and/or other application that provided the content being presented at the graphical user interface 206.

As provided in view 260 of FIG. 2C, the automated assistant can cause the launcher OEM vehicle application to provide one or more suggestions 262 for invoking a separate application to perform one or more actions using a different application. The automated assistant 228 can use data characterizing content previously rendered at the graphical user interface 206, and content currently being rendered at the graphical user interface 206, in order to generate a suitable suggestion for the user 202. For example, because the messaging application was indicated as having a new message from Jane, in FIG. 2A, and the ETA from the navigation application has been provided at FIG. 2C, the automated assistant can suggest that the user invoke the automated assistant to send this new ETA to Jane. Specifically, a suggestion data generated by the automated assistant 228 can characterize a spoken utterance such as, "Assistant, send my new ETA to Jane." The suggestion data can be provided from the automated assistant 228 to the launcher OEM vehicle application and/or a server device, associated with the navigation application, in order to cause one or more suggestions 262 to be presented at the graphical user interface 206 according to the suggestion data.

Figure 3:
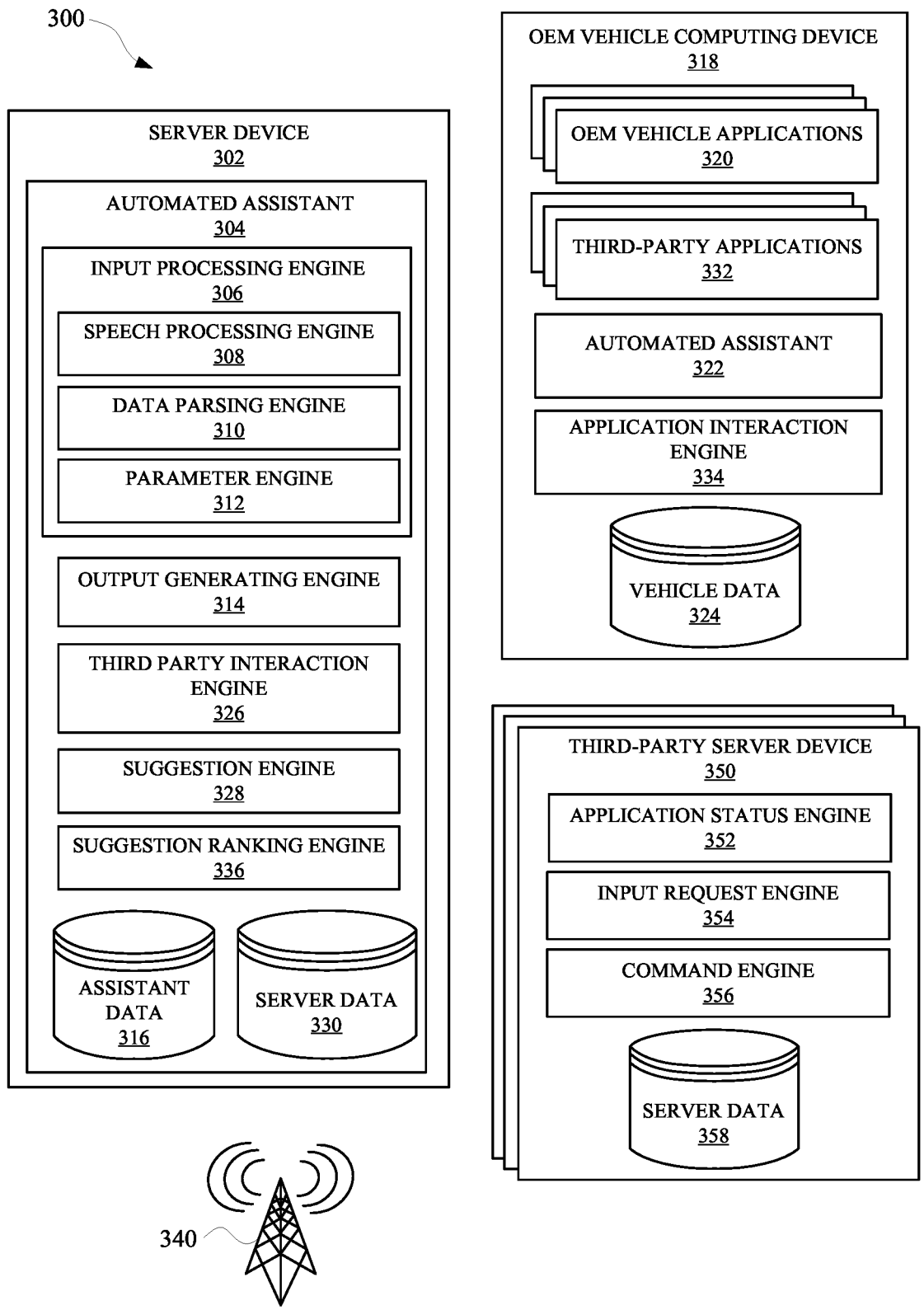
FIG. 3 illustrates a system that provides an OEM vehicle computing device that includes a vehicle automated assistant, which can render suggestions via OEM vehicle applications and/or third-party applications, and initialize actions via the OEM vehicle applications and/or the third-party applications.

FIG. 3 illustrates a system 300 provides an OEM vehicle computing device 318 that includes a vehicle automated assistant 322, which can render suggestions via OEM vehicle applications 320 and/or third-party applications 332, and initialize actions via the OEM vehicle applications 320 and/or the third-party applications 332. The system 300 can include an automated assistant 304, which can operate as part of an assistant application that is provided at one or more computing devices, such as the OEM vehicle computing device 318 and/or a server device 302. A user can interact with the automated assistant 304 via an assistant interface, which can be a microphone, a camera, a touch screen display, a user interface, and/or any other apparatus capable of providing an interface between a user and an application.

For instance, a user can initialize the automated assistant 304 by providing a verbal, textual, and/or a graphical input to an assistant interface (e.g., an assistant interface of the OEM vehicle computing device 318 and/or an assistant interface of any other client device) to cause the automated assistant 304 to perform a function (e.g., provide data, control a peripheral device, access an agent, generate an input and/or an output, etc.). The OEM vehicle computing device 318 can include a display device, which can be a display panel that includes a touch interface for receiving touch inputs and/or gestures for allowing a user to control applications of the OEM vehicle computing device 318 via the touch interface. In some implementations, the OEM vehicle computing device 318 can lack a display device, thereby providing an audible user interface output, without providing a graphical user interface output; in such an arrangement, the vehicle computing device 318 may be coupled or connected to an external display device to render the graphical user interface described herein. Furthermore, the OEM vehicle computing device 318 can provide a user interface, such as a microphone(s), for receiving spoken natural language inputs from a user. In some implementations, the OEM vehicle computing device 318 can include a touch interface and can be void of, or include, a camera, but can optionally include one or more other sensors.

The OEM vehicle computing device 318 and/or other third-party server device(s) 350 can be in communication with the server device 302 over a network 340, such as the internet. Additionally, the OEM vehicle computing device 318 and other client devices can be in communication with each other over a local area network (LAN), such as a Wi-Fi network. The automated assistant 322 can offload computational tasks to the server device 302 in order to conserve computational resources at the OEM vehicle computing device 318. For instance, the server device 302 can host the automated assistant 304, and the OEM vehicle computing device 318 can transmit inputs received at one or more assistant interfaces to the server device 302. However, in some implementations, the automated assistant 304 can be hosted at the OEM vehicle computing device 318 as a client automated assistant 322.

In various implementations, all or less than all aspects of the automated assistant 304 can be implemented on the OEM vehicle computing device 318. In some of those implementations, aspects of the automated assistant 304 are implemented via the client automated assistant 322 of the OEM vehicle computing device 318 and can interface with the server device 302, which can implement other aspects of the automated assistant 304. The server device 302 can optionally serve a plurality of users and their associated assistant applications via multiple threads. In implementations where all or less than all aspects of the automated assistant 304 are implemented via a client automated assistant 322 at the OEM vehicle computing device 318, the client automated assistant 322 can be an application that is separate from an operating system of the OEM vehicle computing device 318 (e.g., installed "on top" of the operating system)—or can alternatively be implemented directly by the operating system of the OEM vehicle computing device 318 (e.g., considered an application of, but integral with, the operating system).

In some implementations, the automated assistant 304 and/or the client automated assistant 322 can include an input processing engine 306, which can employ multiple different modules for processing inputs and/or outputs for the OEM vehicle computing device 318 and/or the server device 302. For instance, the input processing engine 306 can include a speech processing engine 308, which can process audio data received at an assistant interface to identify the text embodied in the audio data. The audio data can be transmitted from, for example, the OEM vehicle computing device 318 to the server device 302 in order to preserve computational resources at the OEM vehicle computing device 318.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant as textual data that can be used to generate and/or identify command phrase(s), intent(s), action(s), slot value(s), and/or any other content specified by the user. In some implementations, output data provided by the data parsing engine 310 can be provided to a parameter module 312 to determine whether the user provided an input that corresponds to a particular intent, action, and/or routine capable of being performed by the automated assistant 304 and/or an application or agent that is capable of being accessed via the automated assistant 304. For example, assistant data 316 can be stored at the server device 302 and/or the OEM vehicle computing device 318 as vehicle data 324, and can include data that defines one or more actions capable of being performed by the automated assistant 304 and/or client automated assistant 322, as well as parameters necessary to perform the actions.

In some implementations, the automated assistant 304 can be accessible via an OEM vehicle computing device 318, which can limit local communication between applications that are accessible at the OEM vehicle computing device 318. The automated assistant 304 can operate to provide suggestions for invoking the automated assistant 304 to initialize an OEM vehicle application 320, a third party application 332, and/or a client device to perform one or more actions. The automated assistant 304 can be accessible via the OEM vehicle computing device 318, which can provide access to an instance of an automated assistant 322 that is in communication with the server device 302. Additionally, or alternatively, the automated assistant 304 can be provided at the OEM vehicle computing device 318.

The vehicle computing device 318 can operate an application interaction engine 334 to limit transmission of data between the automated assistant 322 and the third-party applications 332, and/or between the automated assistant 322 and OEM vehicle applications 320. The application interaction engine 334 can send and/or receive data from various applications at the OEM vehicle computing device 318, and determine when, and/or how much data, to share with other applications at the OEM vehicle computing device 318. For example, a third-party application 332 can be available at the OEM vehicle computing device 318, and the third-party application 332 can be in communication with a third-party server device 350. The third-party server device 350 can process requests provided via the OEM vehicle computing device 318 using an input request engine 354, and can be responsive to the requests using a command engine 356.

In some implementations, an application status engine 352 of the third-party server device 350 can generate server data 358, which can characterize a status of one or more third-party applications 332. Furthermore, because a third-party application 332 can be associated with an account of a user, and the account can also be associated with the automated assistant 304 (with prior permission from the user), data can be shared between the third-party server device 350 and the server device 302. For instance, changes in application status determined by the application status engine 352, and/or operations being performed by one or more applications, can be communicated to the automated assistant 304, in order to put the automated assistant 304 on notice of one or more actions being performed by the third-party application(s) 332. A third-party interaction engine 326 can receive data from the third-party server device 350, the OEM vehicle computing device 318, a client device, and/or any other device or apparatus, in order to provide contextual data for the automated assistant 304.

A suggestion engine 328 of the automated assistant 304 can use the contextual data in order to generate suggestions regarding related actions that can be initialized by the automated assistant 304. Furthermore, suggestion data characterizing the suggestions can be stored as assistant data 316 and processed by a suggestion ranking engine 336. The suggestion ranking engine 336 can rank suggestions at least partially based on the contextual data. Furthermore, in some implementations, the suggestion ranking engine 336 can be ranked, using the contextual data, in order to prevent suggesting actions that have recently been performed by an application, and/or are currently being performed by an application.

In some implementations, suggestions can be ranked and/or presented according to the contextual data, which can include details of a route of the user. For instance, the contextual data can indicate whether the user is currently being driven on a portion of the route that lasts for X minutes and/or Y miles. In some implementations, when the portion of the route satisfies a time and/or distance threshold, the suggestion engine 328 can cause one or more suggestion elements to be presented at a graphical user interface of the OEM vehicle computing device 318. However, when the portion of the route does not satisfy the time and/or the distance threshold, the suggestion engine 328 can bypass causing the graphical user interface to present one or more suggestion elements.

Figure 4:
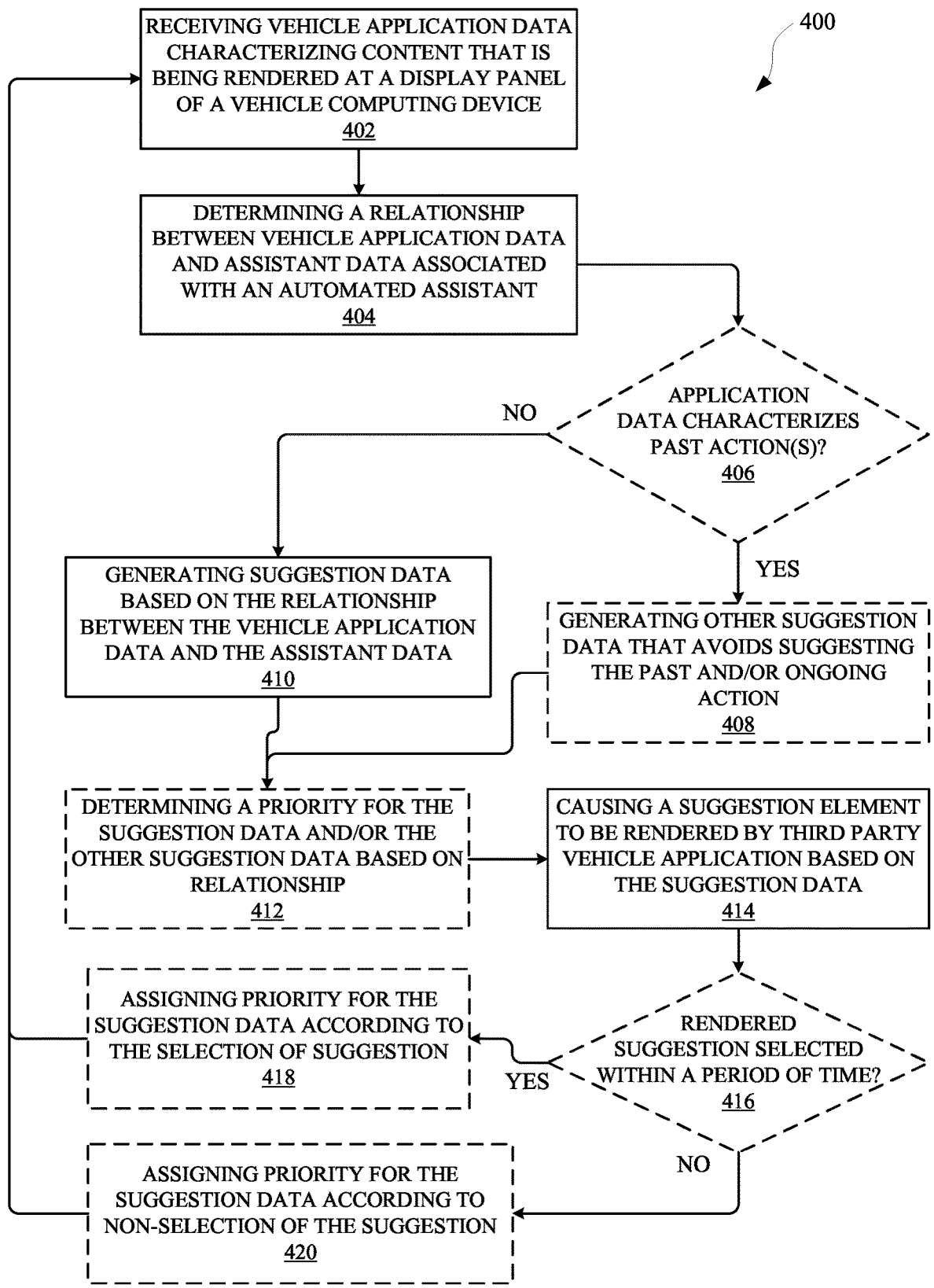
FIG. 4 illustrates a method for providing one or more suggestion elements at a graphical user interface of a third-party vehicle computing device and/or a third-party application operating at the third-party vehicle computing device.

FIG. 4 illustrates a method 400 for providing one or more suggestion elements at a graphical user interface of a third-party vehicle computing device and/or a third-party application operating at the third-party vehicle computing device. The method 400 can be performed by one or more computing devices, applications, and/or any other apparatus or module capable of providing suggestions at a user interface. The method 400 can include an operation 402 that includes receiving vehicle application data characterizing content that is being rendered at a display panel of a vehicle computing device. The vehicle computing device can operate according to limitations that restrict local communication between applications that are accessible via the vehicle computing device.

For example, the vehicle computing device can include an OEM third-party vehicle application, one or more other third-party applications, and/or an automated assistant. The automated assistant can be remote from the vehicle computing device. Therefore, the vehicle computing device can limit communications between the automated assistant and the one or more other third-party applications. For instance, when the vehicle computing device includes a third-party navigation application and/or a third-party messaging application, the aforementioned applications may be restricted from directly communicating with the automated assistant, and instead restricted to communicating exclusively via the vehicle computing device, optionally through the vehicle application. However, the OEM vehicle application can generate the vehicle application data, which can characterized or indicate content that is being rendered at a display panel of the vehicle computing device. Alternatively, or additionally, the OEM vehicle application can generate vehicle application data characterizing one or more operations being performed by one or more other third-party applications, the vehicle, and/or any other apparatus or module that can be associated with the vehicle and/or the vehicle computing device. Restricting direct communication access between an automated assistant and other third-party applications can help to maintain the integrity of the vehicle systems, which can be important for vehicle safety and reliability.

The method 400 can further include an operation 404 of determining a relationship between the received vehicle application data and assistant data that is associated with the automated assistant. For example, the operation 404 can include determining whether the vehicle application data characterizes any information that has been the subject of one or more dialogue sessions between the user and the automated assistant. Alternatively, or additionally, the operation 404 can include determining whether the vehicle application data characterizes any information that has been accessed by the user using one or more computing devices that provide access to the automated assistant. Access to such information can be provided with permission from the user, in order to protect information that the user does not want other devices and/or persons to access. Alternatively, or additionally, the operation 404 can further include determining whether the vehicle application data and the assistant data characterize information that can be associated with a type of data and/or subjective information. For example, a relationship between the vehicle application data and the assistant data can be identified when the vehicle application data indicates that an incoming call is being received at the vehicle computing device from a particular person, and that the automated assistant data indicates that the user has previously invoked the automated assistant to answer calls from the same particular person.

The method 400 can further include an optional operation 406 of determining whether the (vehicle) application data characterizes a past action(s). A past action can be an action (e.g., providing a notification, sending data, accessing data, generating data, etc.) That that has been executed within a period of time before the vehicle application data was received. In some implementations, the period of time can be a threshold period of time that is static or dynamic according to properties of interactions between the user and of the vehicle computing device, and/or the user and the automated assistant. As an example, a third-party application available at the vehicle computing device can provide a notification indicating that a fluid sensor of the vehicle is in an alarm state. This notification can be considered a past action because the notification is being provided at the graphical user interface rendered at the display panel within a threshold period of time of receiving the vehicle application data. In some implementations, a time at which the notification was presented can be determined based on time information that is characterized by the vehicle application data. The automated assistant can have access to an application for tracking certain properties of the vehicle, and therefore can also be privy to the information characterized by the notification about the fluid sensor. However, depending on when the notification was presented at the display panel of the vehicle computing device, the automated assistant may or may not bypass causing a notification about the fluid sensor to appear at the display panel.

When the application data characterizes a past action at the operation 406, the method 400 can proceed to the operation 408, which can include generating other suggestion data that avoids suggesting the past action. As an example, when the third-party application provides a notification related to the fluid sensor, the other suggestion data can avoid suggesting obtaining information about the status of the fluid sensor by providing one or more suggestions that do not include requesting the information detailing the status of the fluid sensor. Rather, the automated assistant can generate suggestion data characterizing a spoken utterance for requesting information about purchasing the fluid corresponding to the fluid sensor, sending a message that includes the information detailing the status of the fluid sensor, placing a phone call to a business that performs maintenance associated with the fluid sensor, and/or any other request that is different from requesting the information detailing the status of the fluid sensor.

When the application data does not characterize a past action as determined at the operation 406, the method 400 can proceed to the operation 410. The operation 410 can include generating suggestion data based on the relationship between the vehicle application data and the assistant data. For example, when a graphical user interface at the third-party application includes content characterizing a route to a particular destination, and the automated assistant has not provided a notification related to the fluid sensor within a threshold period of time, the automated assistant can provide the suggestion data corresponding to a notification for the fluid sensor. The suggestion data can characterize natural language content, such as a spoken utterance that, when spoken by the user, causes the automated assistant to provide information related to a status of the fluid sensor. For example, the spoken utterance can be, "Assistant, what is the status of the fluid sensor?"

The method 400 can proceed from the operation 410 and/or the operation 408 to the operation 412, which can include determining a priority for the suggestion data and/or the other suggestion data based on the relationship between the vehicle application data and the assistant data. In some implementations, the operation 412 can be an optional operation. In some implementations, a strength of correlation between the beautiful vehicle application data and the assistant data can be used to determine the priority for the suggestion data. For instance, a correlation for vehicle application data that characterizes natural language content explicitly included in a dialogue session between the automated assistant and the user can be characterized as having a stronger correlation then another correlation between the vehicle application data and the assistant data when a past dialogue session between the user and the automated assistant resulted in an action that is characterized by the natural language content.

The method 400 can proceed from the operation 412 to the operation 414, which can include causing congestion suggestion element to be rendered by the third-party application based on the suggestion data. Optionally, the suggestion element can be rendered by the vehicle application. Causing the suggestion element to be rendered by the vehicle application can comprise providing action data from the automated assistant to the vehicle application. The action data can be indicative of an action to be performed by the vehicle application upon selection of the suggestion element, and can comprise, for example, parameters for execution of an action associated with the suggestion element. The suggestion element can be a selectable element that can be selected by the user tapping on the display panel at a location where the suggestion element is presented, and/or by the user providing a spoken utterance that includes at least some amount of the natural language content included in the suggestion element. When the suggestion element is rendered at the display panel, the method 400 can proceed to an optional operation 416 of determining whether the rendered suggestion element has been selected within a particular period of time. In some embodiments, the action associated with the suggestion element can be performed by one of the OEM vehicle applications or the third party application based on the action data. Causing the native OEM vehicle application to perform the action can improve security in instances where it is undesirable for third party applications to have access to critical vehicle systems, for example, in autonomous vehicles access to the sensor systems or navigation systems may be restricted to native applications of the vehicle. In other embodiments, the action data can comprise a unique ID number provided by the automated assistant; selection of the suggestion element by a user can cause the vehicle application to cause the automated assistant to perform the action associated with the unique ID number of the action data of the suggestion element. Causing the automated assistant to perform the application can improve the privacy of a user, since third party applications or native OEM applications of the vehicle do not have access to information about the user or about the actions performed by the automated assistant based on the correlation or association between the vehicle application data and the assistant data. Security may therefore be improved for the user.

When they rendered suggestion element is selected within a particular period of time, the method can proceed from the operation 416 to the optional operation 418. The optional operation 418 can include assigning priority for the suggestion data according to the selection of the suggestion. However, if the user does not select the suggestion within a particular period of time, the method can proceed from the operation 416 to the operation 420. The operation 420 can include assigning priority for the suggestion data according to the non-selection of the suggestion element. In some implementations, a priority of the suggestion data can be increased in response to the user selecting the suggestion element and/or the priority of the suggestion data can be decreased in response to the user not selecting the suggestion element within the particular period of time. In this way, as the user interacts with the vehicle computing device, suggestions can be ranked according to their relevance to the user, as well as whether the user has already acknowledged content corresponding to the suggestion data. The method 400 can cycle according to new vehicle application data being rendered by the third-party vehicle application, in order to promote various functions at the vehicle and/or the vehicle computing device, thereby also promoting more efficient uses of the vehicle and/or the vehicle computing device.

Figure 5:
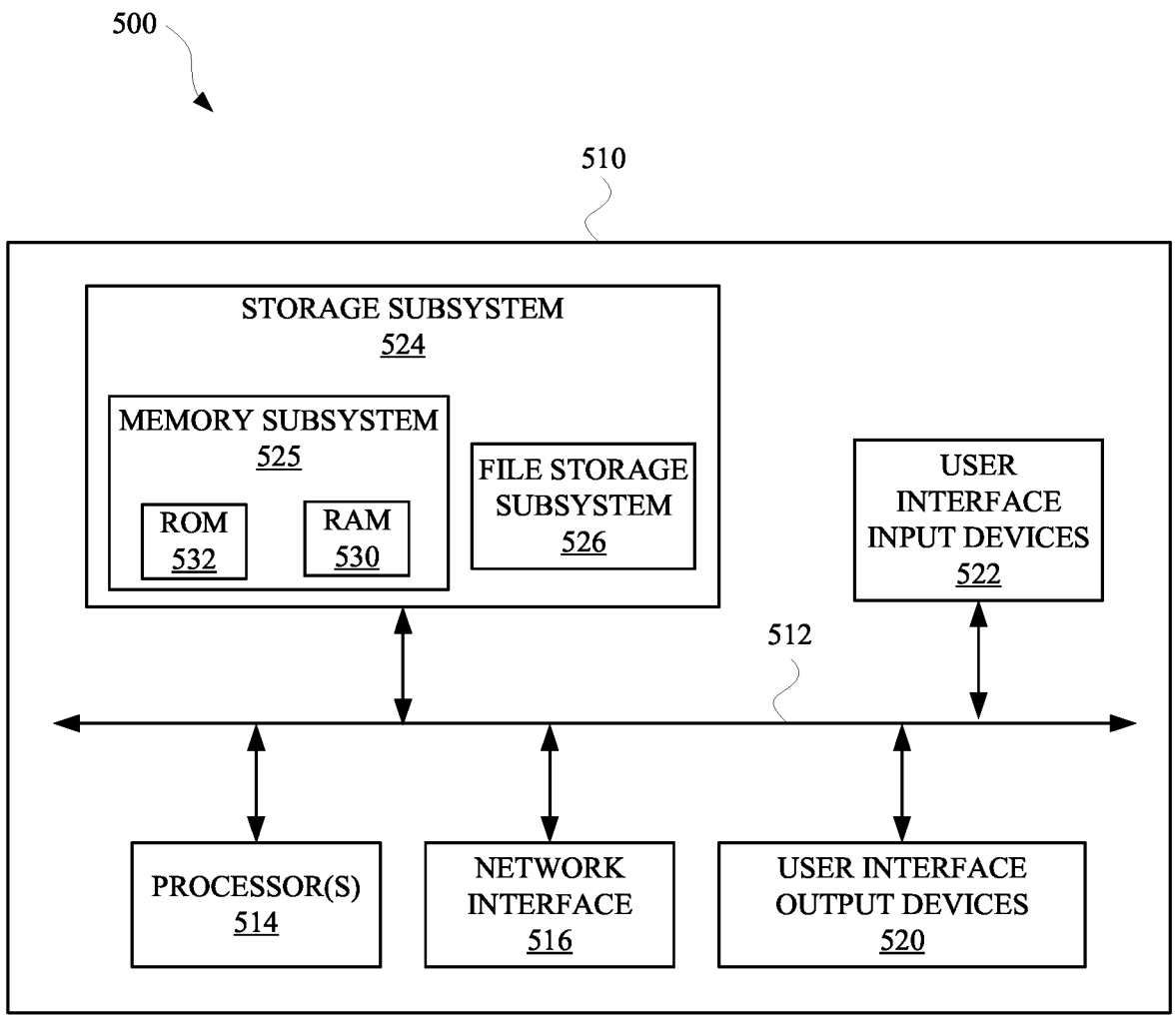
FIG. 5 is a block diagram of an example computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more of OEM vehicle computing device 104 and/or 204, OEM vehicle applications 124 and/or 224, third-party applications 126 and/or 226, automated assistant 128 and/or 228, vehicle 108 and/or 208, server device 302, OEM vehicle computing device 318, third-party server device 350, and/or any other application, device, apparatus, and/or module discussed herein.

These software modules are generally executed by processor 514 alone or in combination with other processors. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, via a vehicle application that is operational when a user is riding in a vehicle, vehicle application data that corresponds to content being rendered at a graphical user interface of the vehicle application, wherein the graphical user interface is displayed at a display panel that is in communication with a vehicle computing device of the vehicle. The method can further include determining, in response to receiving the vehicle application data, that the vehicle application data is associated with assistant data that is available via an automated assistant, wherein the automated assistant is accessible via the vehicle computing device. The method can further include generating suggestion data in response to determining that the vehicle application data is associated with the assistant data, wherein the suggestion data identifies an action that is associated with the assistant data and the vehicle application data, and the suggestion data characterizes natural language content that is different from the content that is being rendered at the display panel. The method can further include determining, based on the suggestion data, a priority of the suggestion data relative to priority data that is associated with previously generated suggestion data, wherein the previously generated suggestion data corresponds to one or more suggestion elements previously rendered at the graphical user interface of the vehicle application. The method can further include, when the priority of the suggestion data relative to the priority data indicates that the suggestion data is prioritized over the other suggestion data: causing a particular suggestion element to be rendered at the graphical user interface of the vehicle application based on the suggestion data and while the user is riding in the vehicle, wherein the particular suggestion element includes the natural language content.

In some implementations, the priority data is based on one or more previous instances in which the user and/or one or more other users selected the one or more suggestion elements while the user and/or the one or more other users were riding in the vehicle. In some implementations, the method can further include determining an estimated time of arrival of the user to a destination location, wherein determining the priority of the suggestion data relative to the priority data that is associated with other suggestion data is at least partially based on the estimated time of arrival of the user to the destination location. In some implementations, the method can further include, when the priority of the suggestion data relative to the priority data indicates that the suggestion data is prioritized over the other suggestion data: determining, subsequent to causing the particular suggestion element to be rendered at the graphical user interface of the vehicle application, that the particular suggestion element was selected, and causing, in response to determining that the particular suggestion element was selected, the priority of the suggestion data to be modified.

In some implementations, the graphical user interface of the vehicle application includes a first area that includes the content, and a second area that includes other content, and wherein causing the particular suggestion element to be rendered at the graphical user interface of the vehicle application includes: causing the particular suggestion element to be rendered at the first area of the graphical user interface and another suggestion element to be rendered at the second area of the graphical user interface, wherein the other suggestion element is at least partially based on the other content. In some implementations, the vehicle application data also corresponds to the other content, and generating the suggestion data includes identifying another action that is associated with the other content. In some implementations, the method can further include generating additional suggestion data that is based on the content provided in the first area of the graphical user interface and on the other content provided in the second area of the graphical user interface, wherein the additional suggestion data identifies an additional action that is associated with the assistant data and the vehicle application data, and the suggestion data characterizes other natural language content that is different from the content and the other content.

In some implementations, the graphical user interface of the vehicle application include a third area corresponding to the automated assistant, and the method further comprises: causing a separate suggestion element to be rendered at the third area of the graphical user interface of the vehicle application based on the additional suggestion data and while the user is riding in the vehicle, wherein the separate suggestion element includes the other natural language content. In some implementations, causing the particular suggestion element to be rendered at the graphical user interface of the vehicle application based on the suggestion data includes providing action data from the automated assistant to the vehicle application. In some implementations, the particular suggestion element is rendered by the vehicle application, and the natural language content of the suggestion element characterizes a spoken utterance that, when spoken by the user to the vehicle computing device, causes the action to be initialized via the automated assistant. In some implementations, the method can further include, when the priority of the suggestion data relative to the priority data indicates that the suggestion data is prioritized over the other suggestion data: determining that the user has provided a spoken input that corresponds to the natural language content of the suggestion element, and causing, in response to determining that the user has provided the spoken input, the automated assistant to initialize the action, wherein the action is performed by a separate vehicle application in response to the automated assistant initializing the action.

In some implementations, the automated assistant is provided by a source that generated the priority data, the vehicle application data is generated by a third-party source that is different from the source, and the separate vehicle application is provided by a separate source from the source and the third-party source. In some implementations, the vehicle application is a navigation application provided by the source and the separate vehicle application is a communication and/or media application provided by the separate source. In some implementations, the automated assistant is provided by a source that generated the priority data, and the vehicle application data is generated by a third-party source that is different from the source. In some implementations, the automated assistant is remote from the vehicle computing device of the vehicle.

In other implementations, a method implemented by one or more processors is set forth as including operations such as determining, by a vehicle application of a vehicle computing device, that a third-party application is providing content via a graphical user interface that is being rendered at a display panel of the vehicle computing device, wherein the vehicle application is accessible to a user via the vehicle computing device and the vehicle computing device is part of a vehicle that is navigating the user to a destination. In some implementations, the method can further include generating, based on determining that the graphical user interface includes the content, vehicle application data that characterizes at least a portion of the content provided by the third-party application. In some implementations, the method can further include providing, by the vehicle application of the vehicle computing device, the vehicle application data to an automated assistant, wherein the automated assistant is also accessible to the user via the vehicle computing device. In some implementations, the method can further include causing, based on providing the vehicle application data to the automated assistant, the automated assistant to provide suggestion data that is generated based on a correspondence between assistant data and the vehicle application data, wherein the assistant data is associated with an account of the user. In some implementations, the method can further include receiving, by the vehicle application and from the automated assistant, the suggestion data, wherein the suggestion data characterizes natural language content that, when spoken by the user to the vehicle computing device, causes the automated assistant to initialize performance of an action by the third-party application. In some implementations, the method can further include causing, in response to receiving the suggestion data from the automated assistant, the third-party application to render the natural language content at the graphical user interface of the third-party application, wherein the natural language content is rendered at the graphical user interface simultaneous to the content being rendered at the graphical user interface, and the vehicle navigating the user to the destination.

In some implementations, the method can further include, subsequent to the natural language content being rendered at the graphical user interface: determining that the user and/or another user has provided a spoken utterance that includes at least some of the natural language content rendered at the graphical user interface, and causing, in response to determining that the user and/or the other user has provided the spoken utterance, the automated assistant to initialize performance of an action by the third-party application. In some implementations, the method can further include determining, in response to receiving the suggestion data, an amount of time and/or distance remaining for the vehicle to navigate the user to the destination; and determining whether the amount of time and/or the distance remaining for the vehicle to navigate the user to the destination satisfies a threshold, wherein causing the third-party application to render the natural language content at the graphical user interface of the third-party application is performed when the amount of time and/or the distance remaining satisfies the threshold. In some implementations, the method can further include providing updated content data characterizing additional data that is being presented at the graphical user interface.

In yet other implementations, a method implemented by one or more processors is set forth as including operations such as providing, from a third-party application to a vehicle application, content data characterizing content to be rendered at a display panel of a vehicle computing device, wherein the vehicle computing device is included in a vehicle that is driving a user to a destination. The method can further include causing, based on providing the content data to the vehicle application, the vehicle application to provide at least a portion of the content data to an automated assistant, wherein the automated assistant is accessible to the user via one or more interfaces of the vehicle computing device, and wherein the vehicle computing device limits accessibility of the content data to the automated assistant. The method can further include receiving, from the vehicle application, suggestion data that is at least partially generated based on the automated assistant receiving at least the portion of the content data, wherein the suggestion data characterizes natural language content that, when included in a spoken utterance from the user to the automated assistant, causes the automated assistant to initialize performance of one or more actions by the third-party application, the vehicle application, and/or another third-party application. The method can causing, in response to receiving the suggestion data from the vehicle application, a display panel of the vehicle computing to render the natural language content at a graphical user interface. The method can further include when the user provides the spoken utterance to the automated assistant via an interface of the vehicle computing device: causing the automated assistant to initialize performance of the one or more actions by the third-party application, the vehicle application, and/or another third-party application.

In some implementations, at least the portion of the content data is selected for providing to the automated assistant based on rendered data that is displayed at the display panel of the vehicle computing device. In some implementations, the method can further include, when the user provides the spoken utterance to the automated assistant via an interface of the vehicle computing device: providing, via a server device that is in communication with the third-party application, an operating status of the one or more actions to another computing device that is separate from the vehicle computing device.

We claim:

1. A method implemented by one or more processors, the method comprising:
   receiving, via a vehicle application that is operational when a user is riding in a vehicle, vehicle application data indicating a destination location of the user, that corresponds to content being rendered at a graphical user interface of the vehicle application, where the graphical user interface is displayed at a display panel that is in communication with a vehicle computing device of the vehicle;
   receiving assistant data including a communication from an additional user, not riding in the vehicle, that is available via an automated assistant, where the automated assistant is accessible via the vehicle computing device;
   in response to receiving the assistant data and receiving the vehicle application data that indicates the destination location, determining an estimated time of arrival of the user to the destination location;
   in response to determining the estimated time of arrival, generating suggestion data which identifies an action of transmitting the estimated time of arrival to the additional user; and
   causing, while the user is riding in the vehicle and before the user arrives at the destination location, a particular suggestion element to be rendered at a first area of the graphical user interface of the vehicle application based on the suggestion data, and a separate suggestion element to be rendered at a separate area of the graphical user interface based on the suggestion data,
wherein the particular suggestion element, when selected via touch input by the user, causes transmission of the estimated time of arrival to the additional user by an application, and
wherein the separate suggestion element, when selected via touch input by the user, causes the action to be performed by a separate application; and
causing a particular additional suggestion element to be rendered at a second area of the graphical user interface of the vehicle application and to be rendered in the second area, separate from, but along with, rendering of the particular suggestion element in the first area and the separate suggestion element in the separate area,
wherein the particular additional suggestion element, when selected via touch input by the user, enables the user to provide an utterance and causes transmission of content, determined from the utterance, to the additional user, and
wherein the particular suggestion element is presented and the particular additional suggestion element is presented based on a measurement satisfying a threshold, wherein the measurement reflects an amount of travel remaining prior to the user reaching the destination.

2. The method of claim 1, wherein generating the suggestion data which identifies the action of transmitting the estimated time of arrival to the additional user comprises:
generating natural language content identifying the action of transmitting the estimated time of arrival to the additional user.

3. The method of claim 2, wherein the natural language content of the particular suggestion element characterizes a spoken utterance that, when spoken by the user to the vehicle computing device, causes the action to be initialized via the automated assistant.

4. The method of claim 3, subsequent to the natural language content being rendered at the graphical user interface:
determining the user and/or another user has provided the spoken utterance, and
causing, in response to determining the user and/or another user has provided the spoken utterance, the automated assistant agent to initialize performance of the action of transmitting the estimated time of arrival to the additional user.

5. The method of claim 1, wherein determining the estimated time of arrival of the user to the destination location comprises determining an amount of time remaining for the vehicle to navigate the user to the destination location.

6. The method of claim 1, wherein determining the estimated time of arrival of the user to the destination location comprises determining a distance remaining for the vehicle to navigate the user to the destination location.

7. The method of claim 1, wherein the measurement reflects an amount of time remaining to reach the destination.

8. The method of claim 1, wherein the measurement reflects a distance remaining to reach the destination.

9. A system, comprising:
one or more processors; and
memory configured to store instructions that, when executed by the one or more processors, cause the one or more processors to perform operations that include:
receiving, via a vehicle application that is operational when a user is riding in a vehicle, vehicle application data indicating a destination location of the user, that corresponds to content being rendered at a graphical user interface of the vehicle application, where the graphical user interface is displayed at a display panel that is in communication with a vehicle computing device of the vehicle;
receiving assistant data including a communication from an additional user, not riding in the vehicle, that is available via an automated assistant, where the automated assistant is accessible via the vehicle computing device;
in response to receiving the assistant data, determining an estimated time of arrival of the user to the destination location;
in response to determining the estimated time of arrival, generating suggestion data which identifies an action of transmitting the estimated time of arrival to the additional user; and
causing, while the user is riding in the vehicle and before the user arrives at the destination location, a particular suggestion element to be rendered at a first area of the graphical user interface of the vehicle application based on the suggestion data, and a separate suggestion element to be rendered at a separate area of the graphical user interface based on the suggestion data,
wherein the particular suggestion element, when selected via touch input by the user, causes transmission of the estimated time of arrival to the additional user by an application, and
wherein the separate suggestion element, when selected via touch input by the user, causes the action to be performed by a separate application; and
causing a particular additional suggestion element to be rendered at a second area of the graphical user interface of the vehicle application and to be rendered in the second area, separate from, but along with, rendering of the particular suggestion element in the first area,
wherein the particular additional suggestion element, when selected via touch input by the user, enables the user to provide an utterance and causes transmission of content, determined from the utterance, to the additional user, and
wherein the particular suggestion element is presented and the particular additional suggestion element is presented based on a measurement satisfying a threshold, wherein the measurement reflects an amount of travel remaining prior to the user reaching the destination.

10. The system of claim 9, wherein generating the suggestion data which identifies the action of transmitting the estimated time of arrival to the additional user comprises:
generating natural language content identifying the action of transmitting the estimated time of arrival to the additional user.

11. The system of claim 10, wherein the natural language content of the particular suggestion element characterizes a spoken utterance that, when spoken by the user to the vehicle computing device, causes the action to be initialized via the automated assistant.

12. The system of claim 11, subsequent to the natural language content being rendered at the graphical user interface, the operations further include:
determining the user and/or another user has provided the spoken utterance, and causing, in response to determining the user and/or another user has provided the spoken utterance, the automated assistant to initialize performance of the action of transmitting the estimated time of arrival to the additional user.

13. The system of claim 9, wherein determining the estimated time of arrival of the user to the destination location comprises determining an amount of time remaining for the vehicle to navigate the user to the destination location.

14. The system of claim 9, wherein determining the estimated time of arrival of the user to the destination location comprises determining a distance remaining for the vehicle to navigate the user to the destination location.

15. A non-transitory computer-readable medium configured to store instructions that, when executed by one or more processes, cause the one or more processors to perform operations that include:
  receiving, via a vehicle application that is operational when a user is riding in a vehicle, vehicle application data indicating a destination location of the user, that corresponds to content being rendered at a graphical user interface of the vehicle application, where the graphical user interface is displayed at a display panel that is in communication with a vehicle computing device of the vehicle;
  receiving assistant data including a communication from an additional user, not riding in the vehicle, that is available via an automated assistant, where the automated assistant is accessible via the vehicle computing device;
  in response to receiving the assistant data, determining an estimated time of arrival of the user to the destination location;
  in response to determining the estimated time of arrival, generating suggestion data which identifies an action of transmitting the estimated time of arrival to the additional user; and
  causing, while the user is riding in the vehicle and before the user arrives at the destination location, a particular suggestion element to be rendered at a first area of the graphical user interface of the vehicle application based on the suggestion data, and a separate suggestion element to be rendered at a separate area of the graphical user interface based on the suggestion data,
    wherein the particular suggestion element, when selected via touch input by the user, causes transmission of the estimated time of arrival to the additional user by an application, and
    wherein the separate suggestion element, when selected via touch input by the user, causes the action to be performed by a separate application; and
  causing a particular additional suggestion element to be rendered at a second area of the graphical user interface of the vehicle application and to be rendered in the second area, separate from, but along with rendering of the particular suggestion element in the first area,
    wherein the particular additional suggestion element, when selected via touch input by the user, enables the user to provide an utterance and causes transmission of content, determined from the utterance, to the additional user, and
    wherein the particular suggestion element is presented and the particular additional suggestion element is presented based on a measurement satisfying a threshold, wherein the measurement reflects an amount of travel remaining prior to the user reaching the destination.

16. The non-transitory computer-readable medium of claim 15, wherein generating the suggestion data which identifies the action of transmitting the estimated time of arrival to the additional user comprises:
  generating natural language content identifying the action of transmitting the estimated time of arrival to the additional user.

17. The non-transitory computer-readable medium of claim 16, wherein the natural language content of the particular suggestion element characterizes a spoken utterance that, when spoken by the user to the vehicle computing device, causes the action to be initialized via the automated assistant.

18. The non-transitory computer-readable medium of claim 17, subsequent to the natural language content being rendered at the graphical user interface, the operations further include:
  determining the user and/or another user has provided the spoken utterance, and
  causing, in response to determining the user and/or another user has provided the spoken utterance, the automated assistant agent to initialize performance of the action of transmitting the estimated time of arrival to the additional user.

19. The non-transitory computer-readable medium of claim 15, wherein determining the estimated time of arrival of the user to the destination location comprises determining an amount of time remaining for the vehicle to navigate the user to the destination location.

20. The non-transitory computer-readable medium of claim 15, wherein determining the estimated time of arrival of the user to the destination location comprises determining a distance remaining for the vehicle to navigate the user to the destination location.

* * * * *